(12) United States Patent
Madhukar et al.

(10) Patent No.: US 12,301,543 B2
(45) Date of Patent: May 13, 2025

(54) MULTIPLE VIRTUAL PRIVATE NETWORK ACTIVE CONNECTION MANAGEMENT

(71) Applicant: Microsoft Technology Licensing, LLC, Redmond, WA (US)

(72) Inventors: Pankaj Kumar Madhukar, Hyderabad (IN); Tushar Gupta, Hyderabad (IN); Deepti Aggarwal, Delhi (IN); Gaurav Kumar, Mohali (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 323 days.

(21) Appl. No.: 17/828,871

(22) Filed: May 31, 2022

(65) Prior Publication Data

US 2023/0388272 A1 Nov. 30, 2023

(51) Int. Cl.
*H04L 9/40* (2022.01)
*H04L 12/46* (2006.01)
*H04L 45/00* (2022.01)
*H04L 45/42* (2022.01)

(52) U.S. Cl.
CPC ...... *H04L 63/0272* (2013.01); *H04L 12/4641* (2013.01); *H04L 45/42* (2013.01); *H04L 45/566* (2013.01); *H04L 63/0236* (2013.01); *H04L 63/0435* (2013.01)

(58) Field of Classification Search
CPC . H04L 63/0272; H04L 12/4641; H04L 45/42; H04L 45/566; H04L 63/0236; H04L 63/0435
See application file for complete search history.

(56) References Cited

U.S. PATENT DOCUMENTS

| | | | | |
|---|---|---|---|---|
| 6,141,686 A | * | 10/2000 | Jackowski | H04L 41/065 709/224 |
| 6,148,336 A | * | 11/2000 | Thomas | H04L 41/0894 709/224 |
| 6,865,607 B1 | * | 3/2005 | de Jong | G06F 9/541 709/227 |
| 7,451,391 B1 | * | 11/2008 | Coleman | G06F 40/143 709/224 |
| 8,127,350 B2 | | 2/2012 | Campagna et al. | |
| 8,272,046 B2 | | 9/2012 | Gundavelli et al. | |

(Continued)

FOREIGN PATENT DOCUMENTS

EP 3742289 A1 11/2020
WO WO-2009042995 A2 * 4/2009 ............. G06Q 10/06

OTHER PUBLICATIONS

Search History (Year: 2024).*

(Continued)

*Primary Examiner* — Samson B Lemma
*Assistant Examiner* — Richard W Cruz-Franqui
(74) *Attorney, Agent, or Firm* — Schwegman Lundberg & Woessner, P.A.

(57) ABSTRACT

A computer implemented method includes intercepting a packet in a mobile device, the packet having a destination network address. A first virtual private network (VPN) plugin for which the packet is intended is identified out of multiple active VPN plugins. The packet is forwarded to the first VPN plugin. The first packet is forwarded via the VPN tunnel while keeping other VPNs having corresponding other plugins active, enabling multiple remote VPN connections using just one VPN tunnel.

10 Claims, 12 Drawing Sheets

(56) References Cited

U.S. PATENT DOCUMENTS

| | | | |
|---|---|---|---|
| 8,387,131 B2 | 2/2013 | Beachem et al. | |
| 8,638,794 B1* | 1/2014 | Ephraim | H04L 63/0272 |
| | | | 370/254 |
| 9,137,262 B2 | 9/2015 | Qureshi et al. | |
| 9,467,536 B1* | 10/2016 | Kanekar | H04L 45/00 |
| 9,547,461 B2* | 1/2017 | Kobayashi | G06F 3/1247 |
| 9,571,457 B1* | 2/2017 | Hoy | H04L 63/0272 |
| 9,794,215 B2* | 10/2017 | Dinha | H04L 63/0272 |
| 10,542,004 B1* | 1/2020 | Perez | G16Z 99/00 |
| 10,873,891 B2 | 12/2020 | Hill et al. | |
| 2005/0088420 A1* | 4/2005 | Dodge | G06F 3/1263 |
| | | | 345/173 |
| 2006/0195899 A1* | 8/2006 | Ben-Shachar | H04L 63/029 |
| | | | 726/12 |
| 2007/0016691 A1* | 1/2007 | Pepin | H04L 69/18 |
| | | | 709/246 |
| 2007/0106808 A1* | 5/2007 | Vemula | H04L 47/70 |
| | | | 709/230 |
| 2007/0198586 A1* | 8/2007 | Hardy | G06F 16/29 |
| 2007/0234321 A1* | 10/2007 | Mcdowali | G06F 9/44526 |
| | | | 717/141 |
| 2008/0209390 A1* | 8/2008 | Dutta | G06F 8/10 |
| | | | 717/104 |
| 2009/0234953 A1* | 9/2009 | Braslavsky | H04L 67/14 |
| | | | 709/227 |
| 2009/0280844 A1* | 11/2009 | Norton | H04L 65/765 |
| | | | 455/466 |
| 2010/0131654 A1* | 5/2010 | Malakapalli | H04L 67/08 |
| | | | 709/227 |
| 2011/0231935 A1* | 9/2011 | Gula | G06F 21/00 |
| | | | 709/224 |
| 2011/0277028 A1* | 11/2011 | Piazza | H04L 63/0209 |
| | | | 718/1 |
| 2011/0292946 A1* | 12/2011 | Flinta | H04L 12/4633 |
| | | | 370/395.53 |
| 2012/0159145 A1* | 6/2012 | Cheong | G06F 8/61 |
| | | | 713/100 |
| 2013/0247147 A1* | 9/2013 | Pontillo | H04L 63/0272 |
| | | | 370/395.2 |
| 2013/0291086 A1* | 10/2013 | Pontillo | H04L 63/0823 |
| | | | 726/10 |
| 2014/0047535 A1* | 2/2014 | Parla | H04L 63/164 |
| | | | 726/15 |
| 2014/0189139 A1* | 7/2014 | Cheng | H04N 21/8456 |
| | | | 709/231 |
| 2014/0366081 A1 | 12/2014 | Wood | |
| 2016/0004527 A1* | 1/2016 | Udd | H04L 67/10 |
| | | | 717/172 |
| 2017/0134522 A1* | 5/2017 | Mann | H04W 4/24 |
| 2017/0171158 A1* | 6/2017 | Hoy | H04L 63/1408 |
| 2019/0079780 A1* | 3/2019 | Coven | G06N 5/02 |
| 2020/0374284 A1* | 11/2020 | Suresh | H04L 63/0861 |
| 2021/0176091 A1* | 6/2021 | Abraham | H04L 12/4633 |
| 2022/0391224 A1* | 12/2022 | Pinto | G06F 9/541 |
| 2022/0400100 A1* | 12/2022 | Oakley | H04W 12/08 |
| 2023/0049690 A1* | 2/2023 | Ponaka | H04L 12/4641 |
| 2023/0388272 A1* | 11/2023 | Madhukar | H04L 12/4641 |
| 2024/0172067 A1* | 5/2024 | Jia | H04W 36/00838 |

OTHER PUBLICATIONS

NPL Search History (Year: 2024).*

Ravindran et al., Topology Abstraction Service for IP VPNs Core Network Partitioning for Resource Sharing (Year: 2016).*

Wolinsky et al., On the Design and Implementation of Structured P2P VPNs (Year: 2010).*

"Cisco AnyConnect Secure Mobility Client Administrator Guide, Release 4.0", Retrieved from: https://www.cisco.com/c/en/us/td/docs/security/vpn_client/anyconnect/anyconnect40/administration/guide/b_AnyConnect_Administrator_Guide_4-0.pdf, Nov. 6, 2014, 240 Pages.

"VPN Overview for Apple Device Deployment", Retrieved from: https://support.apple.com/en-nz/guide/deployment/depae3d361d0/web, Retrieved Date: Mar. 8, 2022, 3 Pages.

Kirvan, et al., "How to Use Two VPN Connections at the Same Time", Retrieved from: https://www.techtarget.com/searchnetworking/answer/Can-you-have-two-VPN-connections-to-the-same-machine-simultaneously#:~:text=One%20technique%20for%20using%20multiple,as%20OpenVPN%2C%20in%20the%20VM., Jun. 2021, 5 Pages.

"International Search Report and Written Opinion Issued in PCT Application No. PCT/US23/018437", Mailed Date: Jul. 14, 2023, 11 Pages.

* cited by examiner

MULTIPLE VIRTUAL PRIVATE NETWORK ACTIVE CONNECTION MANAGEMENT

BACKGROUND

A virtual private network (VPN) provides a private connection between two points in a network. A VPN can be created by establishing a virtual point to point communication connection over existing networks. A tunneling protocol may be used to create the connection, which may be referred to as a tunnel between the points. The communications between the points may be encrypted. One point, such as a VPN provider, may receive requests for data, such as websites, from a user point, and retrieve the data without revealing an address of the requestor user. VPNs enable users to send and receive data across shared or public networks as if their computing devices were directly connected to the private network. A VPN can provide access to resources that are inaccessible on the public network and is typically used for remote workers.

Many mobile devices allow only one or very few VPN clients to be active at any point in time. Some mobile devices also restrict the number of tunnel endpoints that can be created.

SUMMARY

A computer implemented method includes intercepting a packet in a mobile device, the packet having a destination network address. A first virtual private network (VPN) plugin for which the packet is intended is identified out of multiple active VPN plugins. The packet is forwarded to the first VPN plugin. The first packet is forwarded via the VPN tunnel while keeping other VPNs having corresponding other plugins active, enabling multiple remote VPN connections using just one VPN tunnel.

DETAILED DESCRIPTION

Figure 1:
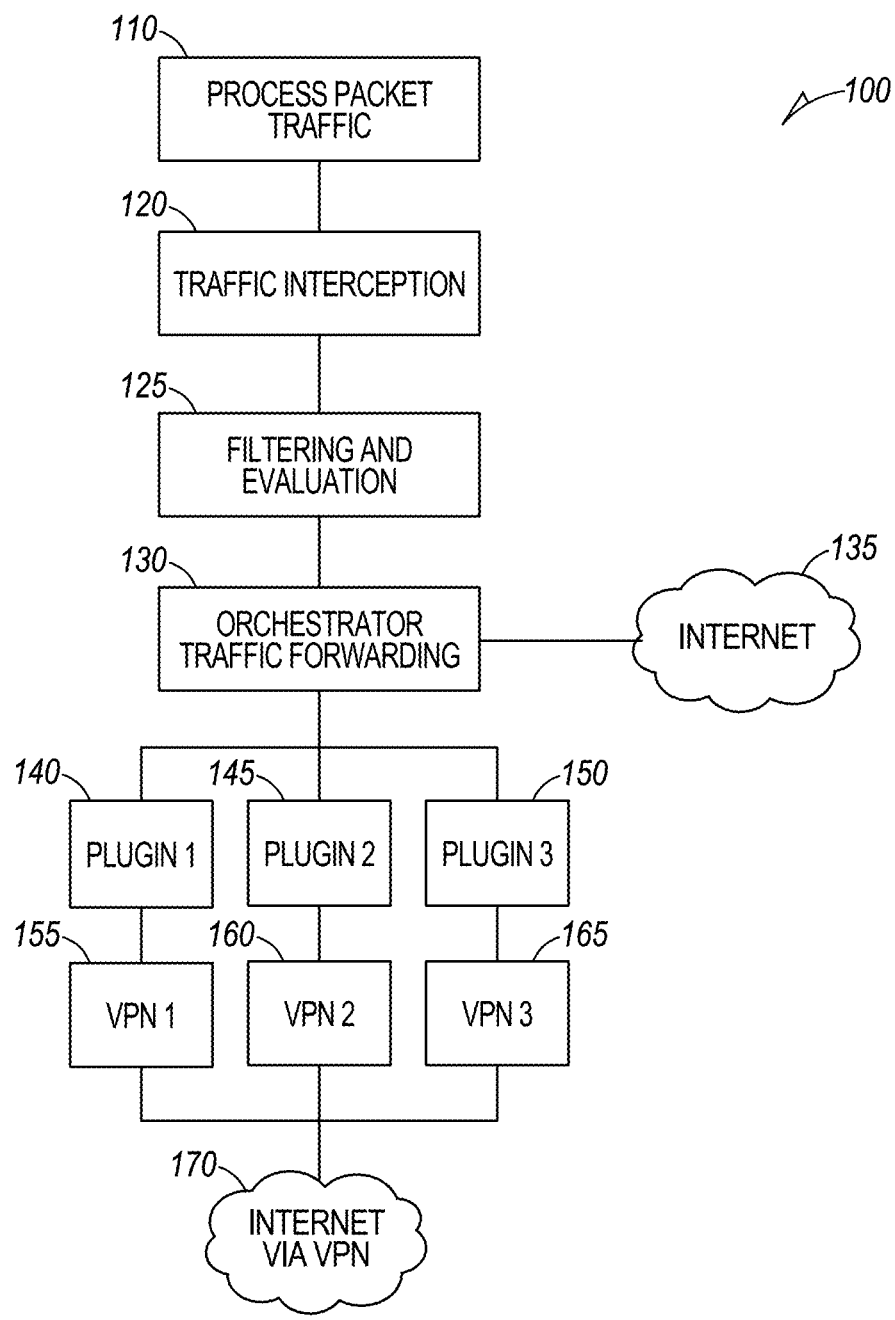
FIG. 1 is a block diagram of a system for managing multiple active VPN connections for a device that supports a single active VPN connection according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Current mobile devices, such Android based devices, enable one active virtual private network (VPN) connection at any point in time. iOS based devices allow two active VPN connections, a personal VPN and a VPN referred to as VPN configurations. As a result, it is difficult to allow multiple remote VPN connections using VPN tunneling. Multiple remote VPN connections may be desired for enterprise level security. The present inventive subject matter provides an improved system that enables multiple remote VPN connections using just one VPN tunnel.

In various examples, an active VPN is leveraged to support multiple VPN servers. Incoming and outgoing communication packets may be intercepted in a mobile device. The packets have a destination network address that may be used to determine whether the packet is intended for a virtual private network (VPN) or a non-private network. The packet is forwarded to a first network in response to determining that the packet is intended for the non-private network. In response to the packet being intended for a VPN, a first VPN plugin of multiple active VPN plugins for which the packet is intended is identified. The packet is then forwarded to the first plugin for the first VPN. The first packet is then forwarded via the first VPN. Other VPNs that receive packets from corresponding other plugins, remain active.

FIG. 1 is a block diagram of a system 100 for managing multiple active VPN connections for a device designed to support a single active VPN connection. Packet traffic may be received at 110 from either an application running on the system 100 or received by the system 100. System 100 may be a mobile device that operates on a platform that is designed to only utilize one active VPN at any point in time. In the case of an iOS device, the VPN configurations is the active VPN that is utilized. The packet traffic is intercepted at a traffic interception layer 120 operating on the system 100. Traffic interception layer 120 deals with the interception of packets. In Android based devices, an extended VPN service may be used. In iOS based devices, tunnel extensions may be used to intercept packets.

The packet traffic is filtered and evaluated at filter layer 125 to determine whether each packet is allowed or blocked. Metadata in the packets may be extracted by filter layer 125 and may be used to make a decision. Server name indication (SNI) retrieval may be performed by filter layer 125. The SNI is a transport layer service (TLS) extension to include a virtual domain as part of secure socket layer (SSL) negotiation. SSL negotiation is included in a TLS handshake process to ensure that client devices, such as system 100, are able to see correct SSL certificates for websites client devices are trying to reach.

Based on the filtering, a packet may be evaluated to determine whether or not the packet is part of traffic that should be blocked. In one example, a bloom filter may be used to determine whether or not to block the packet. For some packet traffic, an endpoint for the packet traffic may be queried to determine whether or not to allow or block that packet or sequence of packets intended for the same endpoint. Filter layer 125 may also determine whether the packet traffic is to be protected and may add metadata to assist with traffic routing decisions.

An orchestrator 130 receives the packet traffic and any metadata that is added to the packet traffic. The orchestrator 130 performs many functions, including traffic forwarding functions that enable packets to be forwarded across a network, such as the internet 135, an enterprise network, or to one or more remote VPN gateways. Traffic forwarding may use rules and associated priorities to help in determining routing of the traffic.

Depending on different use cases, the packets may be modified (encrypted/compressed/altered) before they are dispatched. As these use cases may be developed by different entities, it is desired to keep the system 100 design simple by decoupling processing functionality for the use cases from each other. This decoupled piece of functionality is referred to as a Plugin. Three plugins, plugin 1, 140, plugin 2, 145, and plugin 3, 150 are shown coupled to the orchestrator 130.

A plugin is a set of code that can be called, from the orchestrator 130 via an interface. The orchestrator may forward or dispatch packet traffic to the plugins in multiple different ways to orchestrate the plugins. Each plugin has a corresponding active VPN shown at VPN 1, 155, VPN 2, 160, and VPN 3, 165. Each VPN then forwards the traffic via a corresponding tunnel via the internet 170 or other desired network, which may be a public network, while other VPNs remain active and able to route traffic forwarded to them.

The functions performed by various layers and plugins of system 100 will vary in multiple different example systems as described in further detail below.

Figure 2:
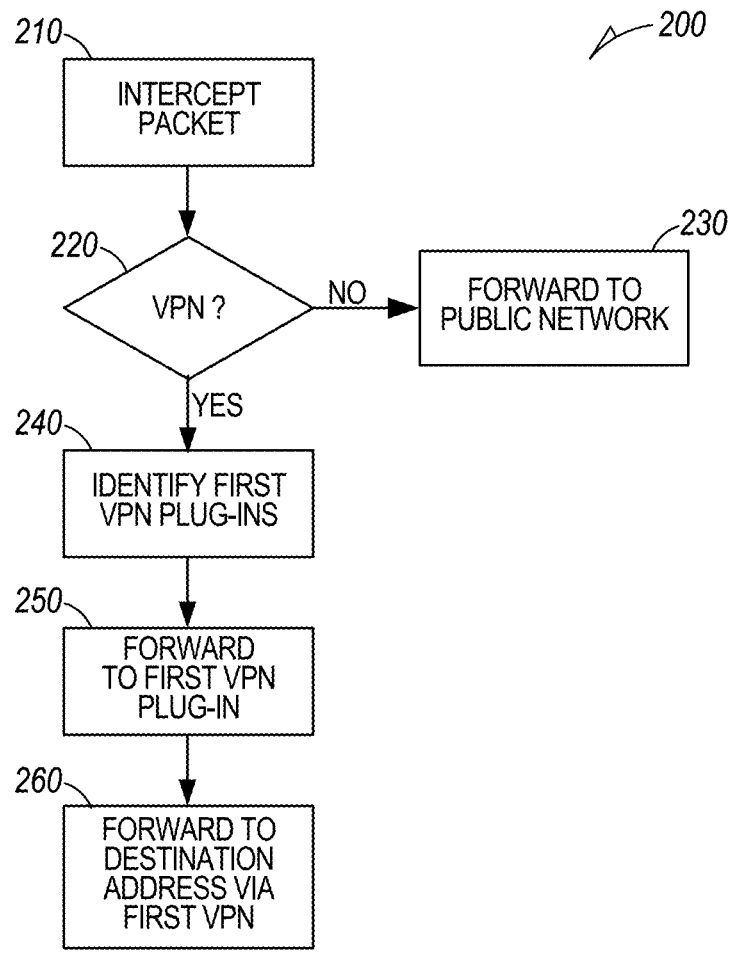
FIG. 2 is a flowchart illustrating a computer implemented method of routing traffic through multiple active VPNs according to an example embodiment.

FIG. 2 is a flowchart illustrating a computer implemented method 200 of routing traffic through multiple active VPNs. Method 200 begins by intercepting, at operation 210, a packet in a mobile device, the packet having a destination network address. At operation 220, method 200 determines whether the packet is intended for a virtual private network (VPN) or a non-private network as a function of a destination network address. The packet is forwarded, at operation 230, to a first network in response to determining that the packet is intended for the non-private network. In response to the packet being intended for a VPN, operation 240 identifies a first VPN plugin of multiple active VPN plugins for which the packet is intended. The packet is then forwarded to the first plugin for the first VPN at operation 250. The first packet is forwarded to the destination address via the first VPN at operation 260, while keeping other VPNs having corresponding other plugins active.

Figure 3:
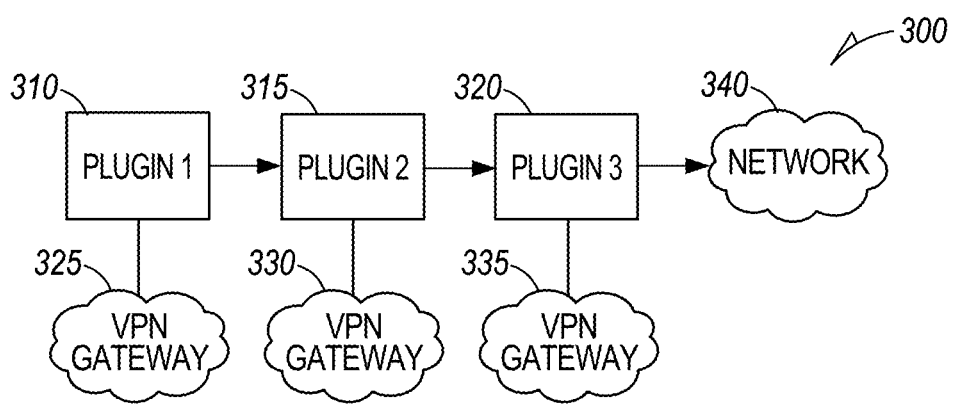
FIG. 3 is a block diagram illustrating a pipeline architecture for identifying a plugin for network traffic according to an example embodiment.

FIG. 3 is a block diagram illustrating a pipeline architecture 300 for identifying a plugin for network traffic. In one example, the orchestrator 130 sets up a linked chain or pipeline of plugins 310, 315, and 320, and forwards packets to lead plugin 310. The plugins 310, 315, and 320 are instantiated by the orchestrator 130 and provided information for a next plugin in the pipeline. The highest priority plugin is the lead plugin 310 with the remaining plugins added in descending order of priority. Each plugin is coupled to a corresponding VPN gateway 325, 330, and 335, which are used to route the packet to the correct destination. If no plugin owns a packet, the packet may be forwarded via a network 340.

The pipeline can be implemented using chains of file descriptors. Each descriptor may represent one plugin's entry point. In the data plane, when the packet arrives, each plugin will decide whether it owns the packet or not, and if it does not, it will send the packet to the next plugin in the pipeline. Plugin management may be performed by the orchestrator 130 and refers to managing the life cycle of different plugins. Every plugin has a set of capabilities and states.

The advantage of this design is that in this case is that no central orchestration is needed for packet processing and potential conflicts are minimized. Each plugin maintains and manages its own route, and the prioritized order of plugins take care of overlapping routes. An overlapping route occurs when two plugins may have a same route. Since the highest priority plugin owns the packet routes the packet via a VPN gateway and does not need to forward the packet to the next plugin, a lower priority plugin that also owns the packet will not even receive the packet.

Figure 4:
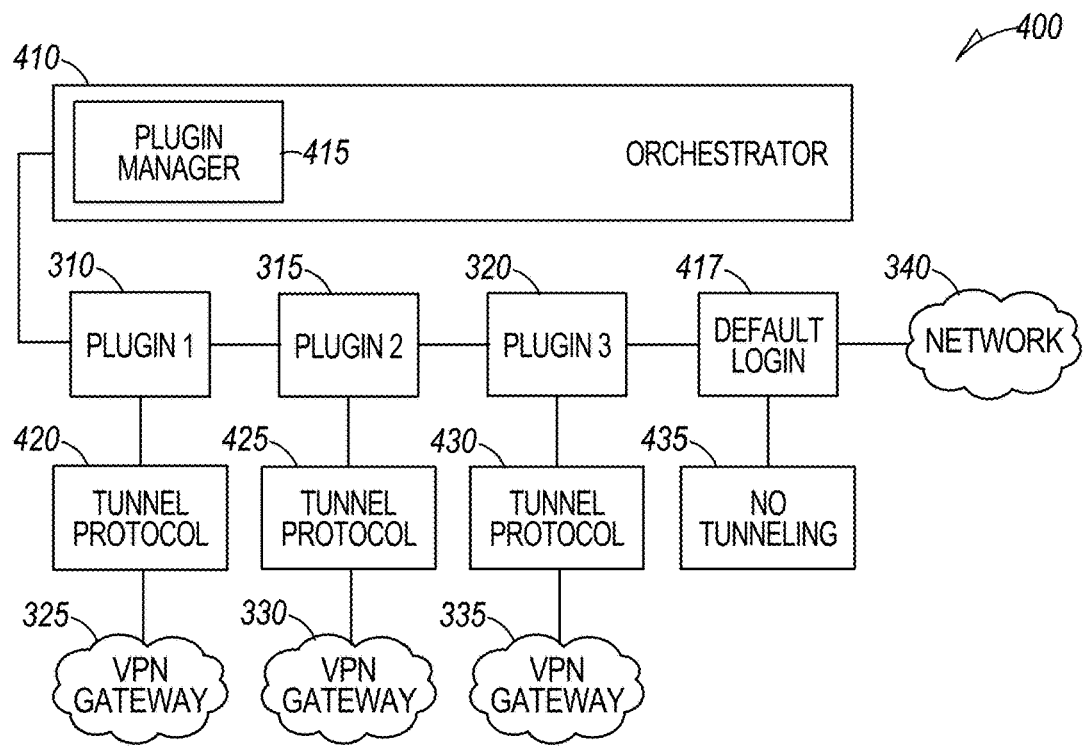
FIG. 4 is a block diagram illustrating further details and context for a pipeline based packet routing architecture according to an example embodiment.

FIG. 4 is a block diagram illustrating further details and context for a pipeline based packet routing architecture 400 utilizing reference numbers from previous figures for like elements. In architecture 400, an orchestrator 410 will function as a plugin manager 415. The complexities with respect to routing will be taken care off by individual plugins 310, 315, and 320. The orchestration logic follows a chain of plugins, with a default plugin 417 serving to forward the packet to a public network 340. Each plugin 310, 315, and 320 implements a corresponding tunnel protocol 420, 425, and 430 consistent with the corresponding VPN gateways 325, 330, and 335. No tunneling is associated with network 340 as indicated at 435.

Orchestrator 410 simply creates the chain of all the plugins in the order of priorities and as soon as a packet arrives, it sends them to the first plugin in the chain, lead plugin 310.

The plugins manage all the complexities around different aspects of traffic, such as route management, domain name service (DNS) resolution, and other functions as needed for each type of VPN. Each plugin will implement interfaces and functionalities that helps in managing the plugins, allowing the orchestrator 410 plugin manager 415 to organize the plugins in the chain. Details and functional interfaces around route management may not be exposed by plugins, as they are handled by the plugins with no need for other elements to be aware of route management.

Figure 5:
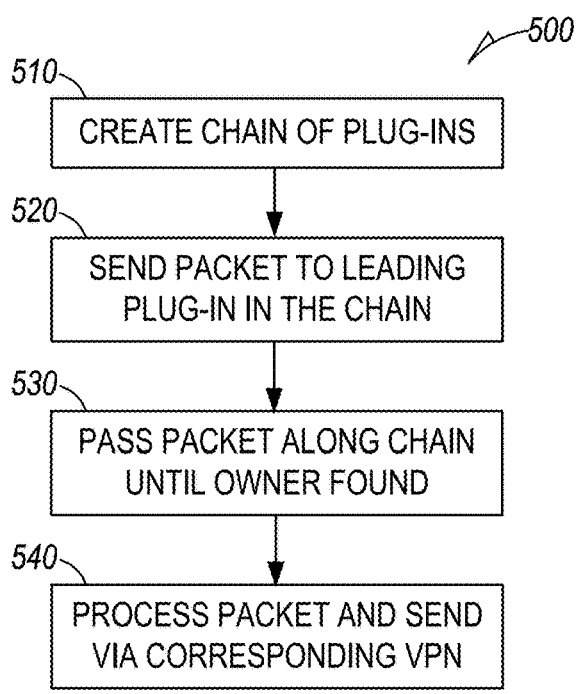
FIG. 5 is a flowchart illustrating a computer implemented pipeline based method of selecting a plugin in a pipeline manner according to an example embodiment.

FIG. 5 is a flowchart illustrating a computer implemented method 500 of selecting a plugin in a pipeline manner for operation 240. In method 500, the first VPN plugin is identified by first creating a chain multiple plugins at operation 510. At operation 520, a packet is sent to a leading plugin in the chain. The packet is passed along the chain at operation 530 until a plugin determines it owns the packet. In other words, the packet is intended to be sent via the VPN associated with the plugin. The packet may be processed at operation 540 and sent via a corresponding VPN. The multiple plugins are prioritized in one example in order in the chain. Each plugin maintains a corresponding VPN route.

Figure 6:
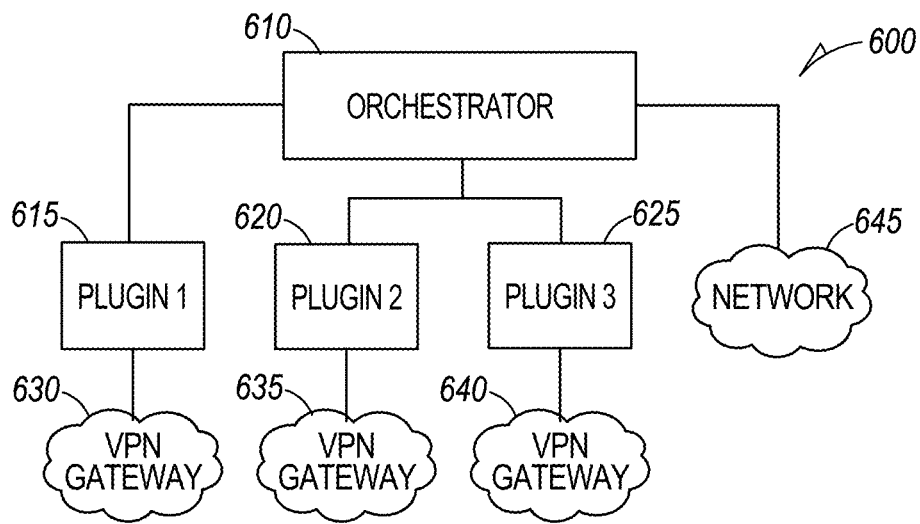
FIG. 6 is a block diagram illustrating a query and cache-based architecture for identifying a plugin for network traffic according to an example embodiment.

FIG. 6 is a block diagram illustrating a query and cache-based architecture 600 for identifying a plugin for network traffic. Architecture 600 includes an orchestrator 610 that is in the data plane. Orchestrator 610 will query each plugin 615, 620, and 625 if it owns the traffic, and if so, it will send the packet to the plugin 615, 620, and 625 that owns the traffic. The queries of the plugins may be performed in the order of priority. The result will be cached for a transient period (TTL) to allow forwarding of packets to the same destination to the corresponding plugin without having the query the plugin. Caching helps reduce query related costs, as a flow of packet traffic may have many packets that may be forwarded automatically after the query based on the first packet of the flow. A default TTL may be selected based on expected lengths of packet flows and may be adjusted based on lengths of flows actually encountered.

Each plugin owns the routing decision. Use of the cache can help minimize network latencies that may be encountered with pipeline based architectures. Since the priority of each plugin is maintained by the orchestrator 610, overlapping route issues are also reduced.

Figure 7:
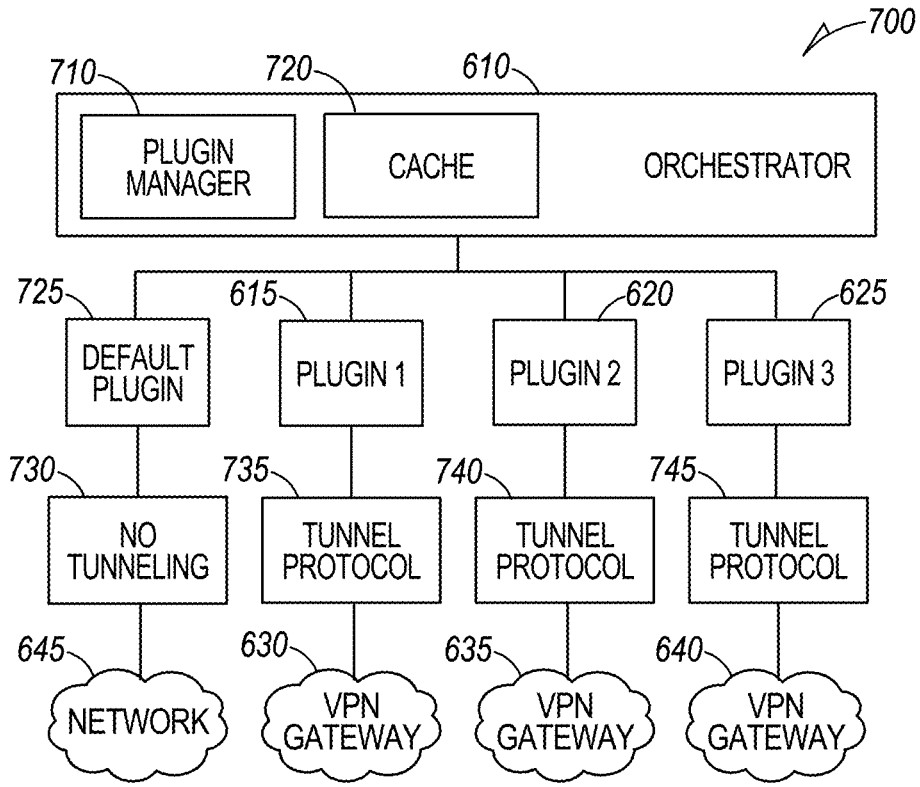
FIG. 7 is a block diagram illustrating further details and context for a query and cache-based architecture according to an example embodiment.

FIG. 7 is a block diagram illustrating further details and context for a query and cache-based architecture at 700 for identifying a plugin for network traffic utilizing reference numbers from previous figures for like elements. In this design, the orchestrator 610 logic involves querying the plugins 615, 620, and 625 via a plugin manager 710 for routes to be owned by plugins. Orchestrator 610 is in the data plane, and for known traffic, doesn't follow the plugin chain. Orchestrator 610 can directly push traffic to a relevant plugin if the mapping is stored in a cache 720 that identifies plugins for traffic flows. To ensure that the orchestrator 610 does not query again for similar traffic for a period of TTL, orchestrator 610 stores that information in the cache 720.

A default plugin 725 serves to forward the packet to network 645 without a tunneling protocol as indicated at 730. Each VPN based plugin 615, 620, and 625 implements a corresponding tunnel protocol 730, 735, and 740 consistent with the corresponding VPN gateways 630, 635, and 640. No tunneling is associated with network 645 as indicated at 730.

Orchestrator 610 instantiates all the plugins via plugin manager 710 and keeps track of plugin priorities. Orchestrator 610 also holds query-able references to all the plugins. After a first packet in a packet flow arrives, plugin manager 710 queries each plugin whether they own the packet, if there are multiple plugins responding to the query, then the one with highest priority is honored. The flow metadata is stored in the cache 720 with TTL to ensure that subsequent packets of the same flow gets pushed to right plugin without the need for querying the plugins.

Plugins hold the key to all the complexities around different aspects of traffic such as route management and DNS resolution. Each plugin will implement interfaces and functionalities to enable the plugin manager 710 to manage the plugins. The plugins also implement a queryable interface which suggests if the plugins own the route for the traffic in question. Details of operation and functional interfaces around route management may not be exposed by plugins.

Figure 8:
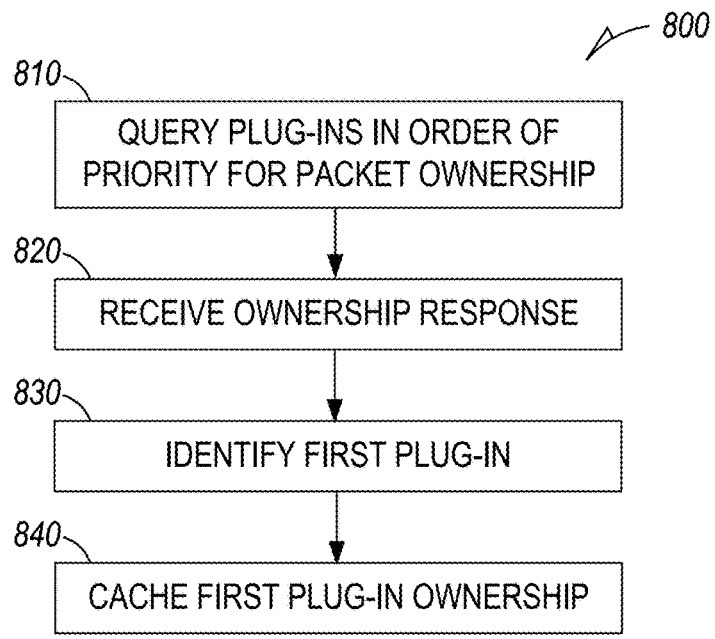
FIG. 8 is a flowchart illustrating a computer implemented query and cache-based method of selecting a plugin according to an example embodiment.

FIG. 8 is a flowchart illustrating a computer implemented method 800 of selecting a plugin for operation 240. In method 800, the first VPN plugin is identified by querying the multiple plugins in order of priority at operation 810. A response is received at operation 820 from the first plugin that owns a route for the packet. The first plugin is identified from the response at operation 830. At operation 840, the ownership is cached for a transient period to avoid querying for additional packets, referred to as traffic flow, addressed to a same destination.

Figure 9:
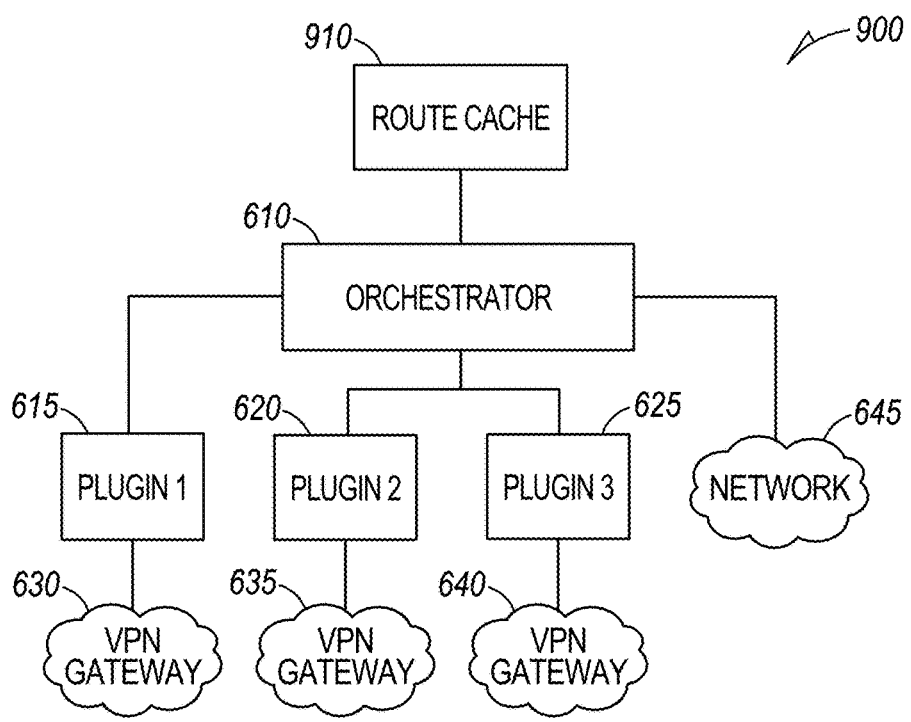
FIG. 9 is a block diagram illustrating a routing enabled query and cache-based architecture according to an example embodiment.

FIG. 9 is a block diagram illustrating a routing enabled query and cache-based architecture 900 for identifying a plugin for network traffic. Architecture 900 is similar to query and cache architecture with differences around when the query is performed and what is queried. Like elements are given the same reference numbers as in previous figures but may perform some different functions. During the initialization of the plugins, the orchestrator 610 queries the plugins 615, 620, and 625 to determine routes to be served by each plugin and creates a route cache 910 identifying routes for each plugin. The route cache is updated or reconciled by orchestrator 610 based on a trigger from the plugins that may be sent in response to a plugin being modified to include a new route, change a route, or remove a route. It is expected that route updates are not a frequent operation. When a packet is received at the orchestrator 610, the route cache 910 is accessed to determine the plugin that owns the route. As before, packets not intended for a VPN are forwarded via network 645.

Figure 10:
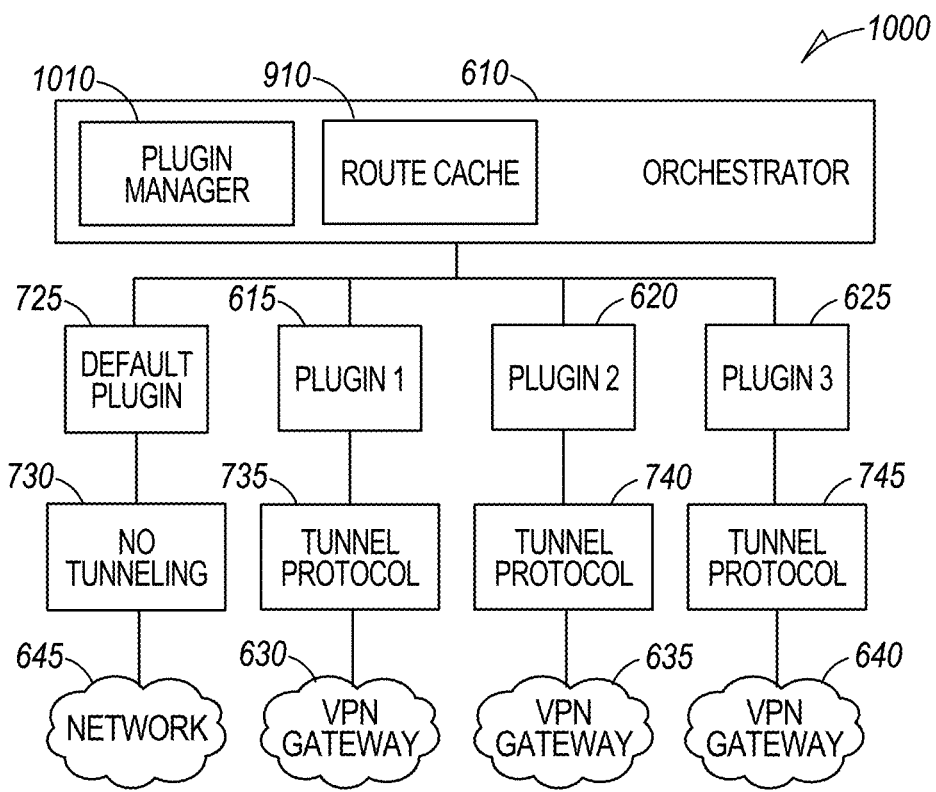
FIG. 10 is a block diagram illustrating further details and context for a routing enabled query and cache-based architecture according to an example embodiment.

FIG. 10 is a block diagram illustrating further details and context for a routing enabled query and cache-based architecture at 1000 for identifying a plugin for network traffic utilizing reference numbers from previous figures for like elements. This is similar to the query and cache-based architecture with one difference including, instead of maintaining cache identifying a plugin for a packet, route tables are stored (destination internet protocol (ip) address→Plugin) in route cache 910. The route cache 910 is built during initialization of plugins by a plugin manager 1010 or during a reconciliation triggered via plugins informing the plugin manager 1010 of a route change. Routes are pushed to the plugin manager 1010 upon occurrence of a reconciliation of routes triggered by callback interfaces. Any of the plugins can push changes up to the orchestrator 610 in this manner.

Figure 11:
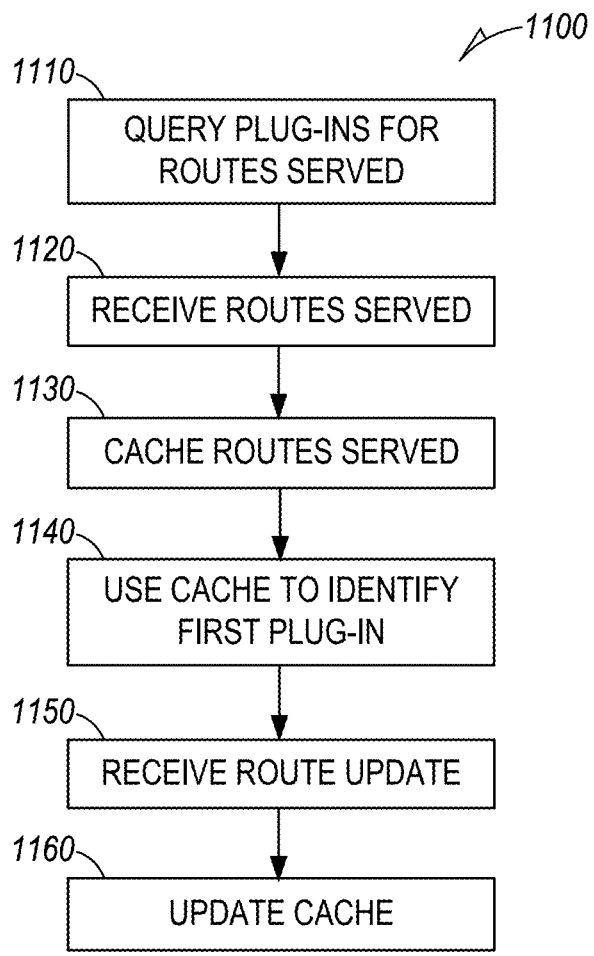
FIG. 11 is a flowchart illustrating a routing enabled query and cache-based computer implemented method of selecting a plugin according to an example embodiment.

FIG. 11 is a flowchart illustrating a computer implemented method 1100 of selecting a plugin for operation 240. In method 1100, multiple plugins are queried at operation 1110 for routes served by the plugins. Routes are received at operation 1120 from the plugins that serve the routes. Operation 1130 caches the routes served by the plugins, along with an indication of the plugin and destination, to identifying plugins. At operation 1150, the cached routes are used to identify the first plugin. The multiple plugins may be prioritized such that the first plugin is identified based on a highest priority in response to multiple plugins serving a same route.

Routes may change over time. In one example, method 1100 receives a route update from a plugin at operation 1150, and at operation 1160 updates the cache with the route update.

Figure 12:
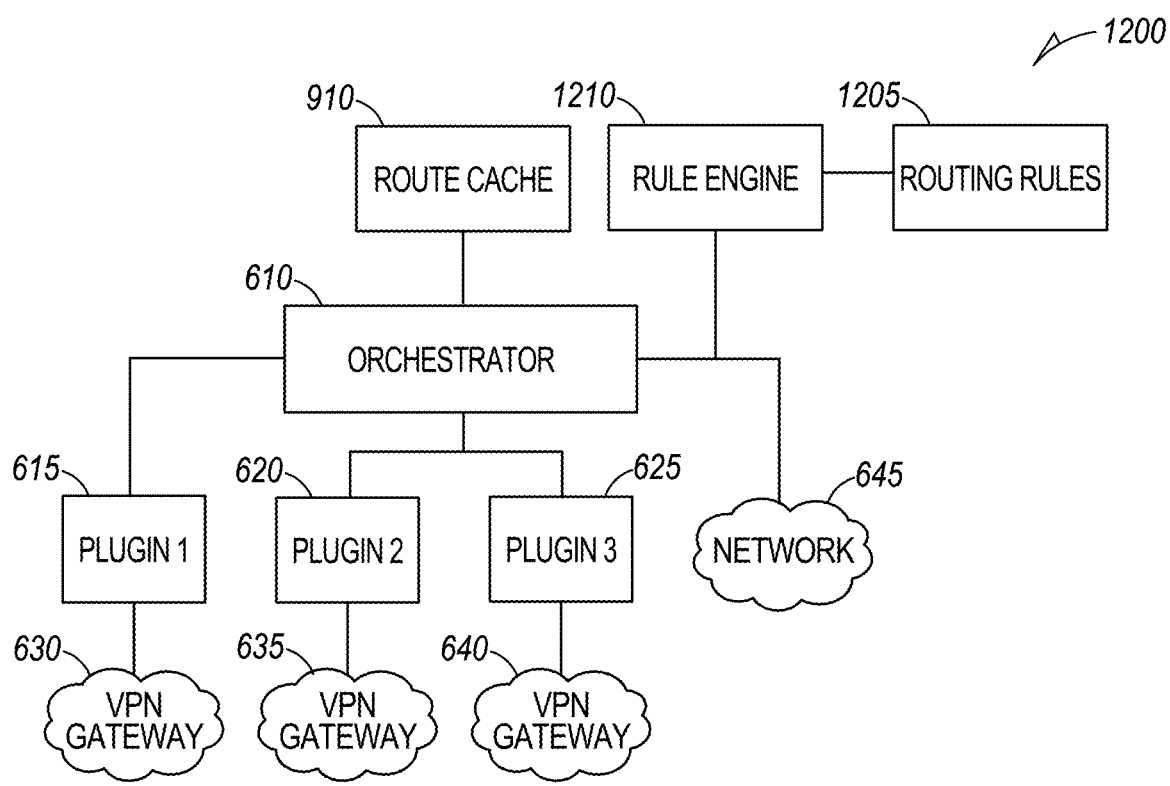
FIG. 12 is a block diagram illustrating a decide and cache-based architecture for identifying a plugin for network traffic according to an example embodiment.

FIG. 12 is a block diagram illustrating a decide and cache-based architecture 1200 for identifying a plugin for network traffic. Like reference numbers are use from previous figures for like elements. Such elements may perform different functions Architecture 1200 is very similar to the routing enabled architecture. In architecture 1200, the orchestrator 610 retrieves the rules 1205 from each plugin and owns the processing of the rules via a rules engine 1210 that uses the same rules as used by plugins to determine routes. The outcome of rule processing will be routes which will be stored in route cache 910.

In architecture 1200, the orchestrator 610 plays a central role in deciding which plugins can serve the packets. To make that decision, orchestrator 610 maintains routes for the plugins. The control plane operation will help in building the in-process route cache 910.

Figure 13:
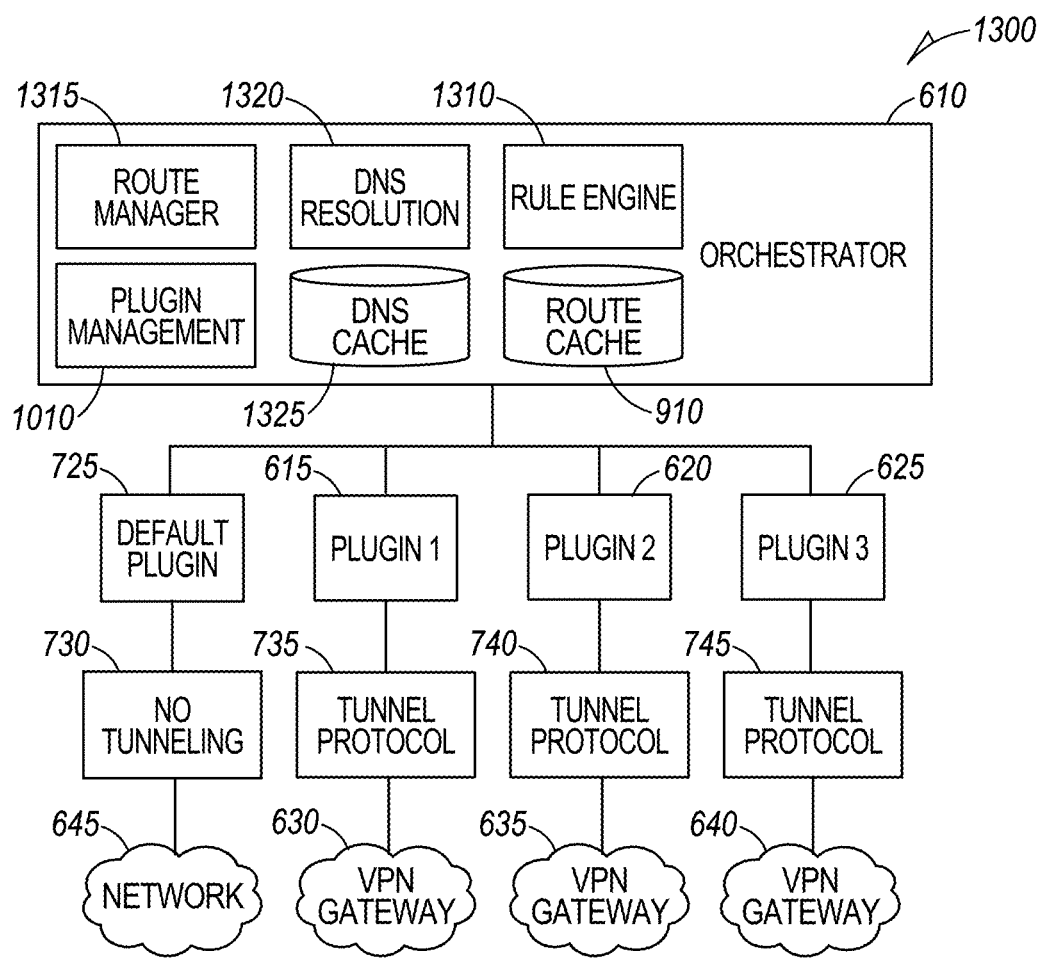
FIG. 13 is a block diagram illustrating further details and context for a decide and cache-based architecture according to an example embodiment.

FIG. 13 is a block diagram illustrating further details and context for a decide and cache-based architecture at 1300 for identifying a plugin for network traffic utilizing reference numbers from previous figures for like elements.

The orchestrator 610 of architecture 1300 also includes a route manager 1315, DNS resolution 1320, and an DNS cache 1325. These elements are functions that are normally provided by VPNs but are moved up to the orchestrator 610 to enable both route determination and forwarding of packets to the correct plugin.

Orchestrator 610 in architecture 1300 instantiates all the plugins and keeps a track of its priorities. The orchestrator 610 also holds queryable references to all the plugins and evaluates rules and route preferences and decide which plugin need to take care of the packet and pushes the packet directly to the plugin.

The DNS resolution 1320 can be done locally as well as on the remote VPN server. There are different factors that decide where DNS resolution should occur. For some systems, there is no specific requirement on where DNS resolution should happen, though it helps if the DNS resolution happens on the remote VPN gateway from a security point of view. Additionally, that may help achieve better network latencies.

However, there are specific scenarios around enterprise systems where DNS resolution needs to happen over a VPN tunnel and if that doesn't happen addresses won't get resolved.

There are two design choices available to achieve DNS resolution over a VPN tunnel. IN a first design, the plugins may be queried. Orchestrator 610 asks each of the plugins whether they can resolve the address. And if multiple plugins claim that they can resolve the IP, the highest priority plugin wins. This verdict is further stored in an in-memory cache, the DNS cache 1325 which the orchestrator 610 maintains. The DNS cache 1325 will help in reducing redundant network calls in subsequent flows. There will be a TTL associated with each cache entry to ensure stale IP addresses are not used. This design option requires a DNS resolver in the system. Android based systems and iOS based systems do not provide capabilities to query a fully qualified domain name (FQDN)/uniform resource locator (URL) against given DNS server.

A second design option includes configuring merged DNS server lists. In this option, the orchestrator 610 obtains a list of configured DNS servers from plugins and merges them in the order of priorities.

Route manager 1315 handles the decision on where to send a packet. The route manager 1315 can also manipulate packets needed for routing. An example of these manipulations involve modifying the destination based on DNS resolution 1320.

There are primarily two ways in which the information about routes can be gathered in the system:
1) Routes are advertised by different VPN servers/gateways and orchestrator gets the information about the routes via plugins, or routes are sent to the client via a control channel.
2) Enterprise administrators may configure the routes explicitly and push the routes via control channels to all the devices. The routes may be configured and pushed via a network as a service (NaaS) scenario.

Some security systems utilize a global list of URLs where security is to be provided. The global list is published and shared with the system, and a user may have options to override the list.

After the routes are published, orchestrator tries to evaluate if there are overlapping routes, and in those cases discard the overlapping routes from less priority plugins. There are conditional routes as well, for example, if the customer has connected to an untrusted network, routes from a high priority plugin may take priority but if it is not connected to an untrusted network, the packet may flow to internet directly (default plugin takes the priority).

The rule engine 1310 takes metadata extracted from the filtering layer 125 to determine if there is a rule that satisfies conditions in the metadata. If the conditions are satisfied, the plugin that owns the rules are sent that packet, unless a higher priority plugin claims that traffic.

Traffic forwarding by the orchestrator is pluggable and has a notion of different plugins to support different use cases. These plugins are in-process plugins but decoupled enough to regress behavior of a different scenario. The plugins can then interact with a tunnel protocol layer to push data to their respective destination. The orchestration logic to decide whether a plugin will serve a packet is based on routing rules. If rules are overlapping, priorities may be used to determine which plugins serve the packet. Irrespective of the architecture, the traffic forwarder broadly consists of orchestrator and plugins.

Figure 14:
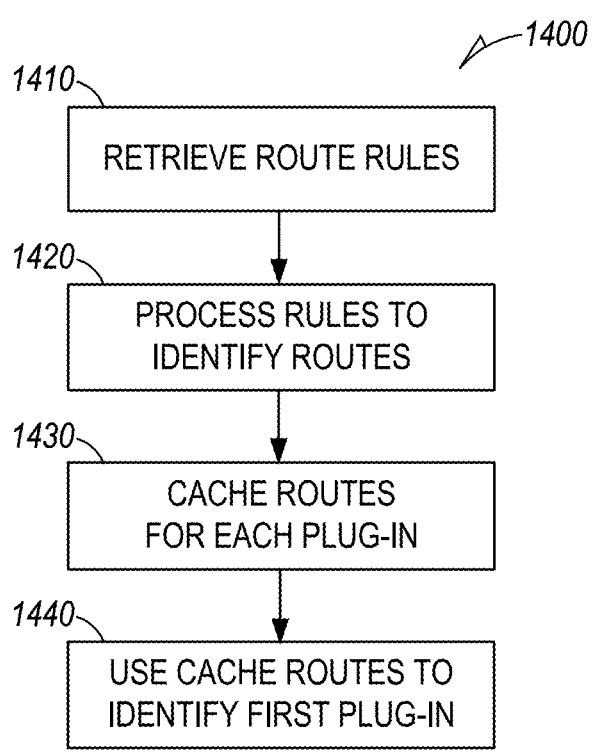
FIG. 14 is a flowchart illustrating a decide and cache-based computer implemented method of selecting a plugin according to an example embodiment.

FIG. 14 is a flowchart illustrating a computer implemented method 1400 of selecting a plugin for operation 240. In method 1400, route rules are retrieved at operation 1410 for determining routes served by the plugins. The rules are processed at operation 1420 to identify the routes for each plugin. Operation 1430 caches the routes served by the plugins to identify the corresponding plugins for future packets. The cached routes are used at operation 1440 to identify the first plugin.

Figure 15:
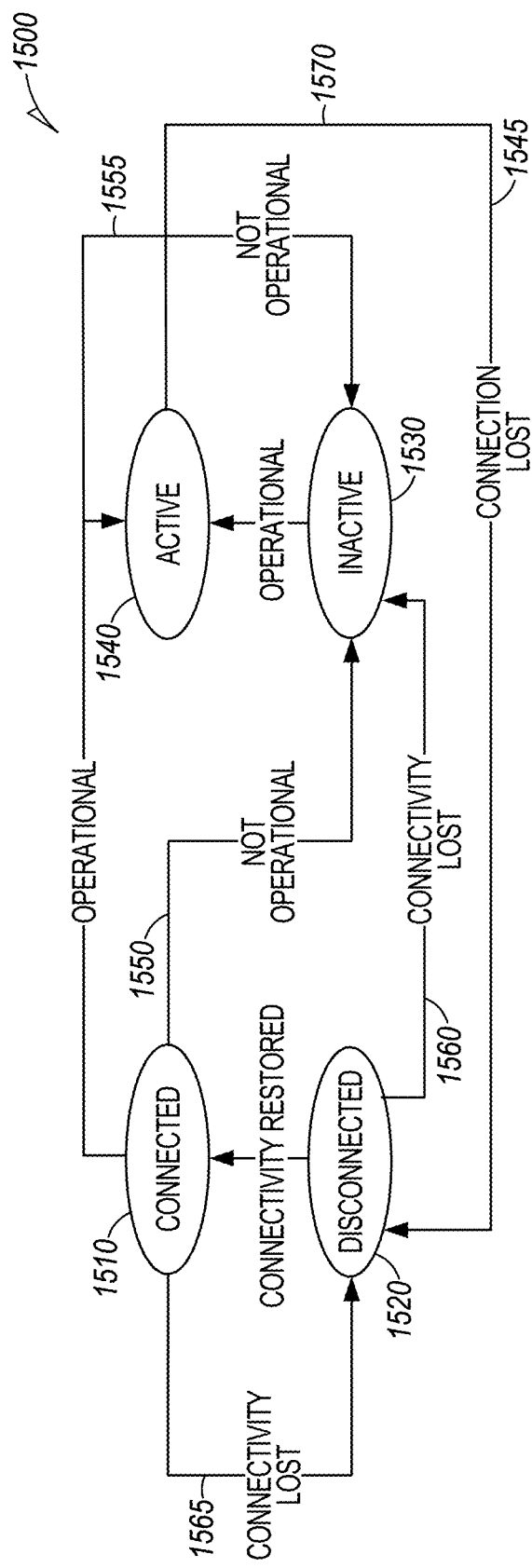
FIG. 15 is a state management diagram illustrating plugin states managed by an orchestrator according to an example embodiment.

FIG. 15 is a state management diagram illustrating plugin states managed by the orchestrator plugin manager generally at 1500. Plugin management refers to managing the life cycle of different plugins. Every plugin has a set of capabilities and states. The different states of the plugins can be connected state 1510, disconnected state 1520, active state 1530, and inactive state 1540.

A plugin will be in connected state 1510 if it has connectivity. If it is connected with a remote VPN gateway, then it is in the connected state 1510.

The plugin becomes active, and in the active state 1540 when it is enabled as well as operational. For example, a one type of plugin becomes active when the customer connects to a public WiFi network. For the plugin to be active, the plugin needs to remain connected. As soon as connection is lost as indicated at 1545, the plugin transitions its state from active to the disconnected state 1520.

A plugin enters the inactive state 1530 when it is enabled but not operational at indicated at 1550 and 1555. In one example, a connectivity may cause transition to the inactive state as indicated at 1560. For example: if the customer is not connected to public wifi, the plugin becomes inactive and the routing will not happen. The plugin may enter the inactive state from all other states.

When the remote VPN server gets disconnected, the plugin goes to disconnected state 1520. This transition may occur from the connected state 1510 as indicated at 1565 or from the active state 1540 as indicated at 1570.

Figure 16:
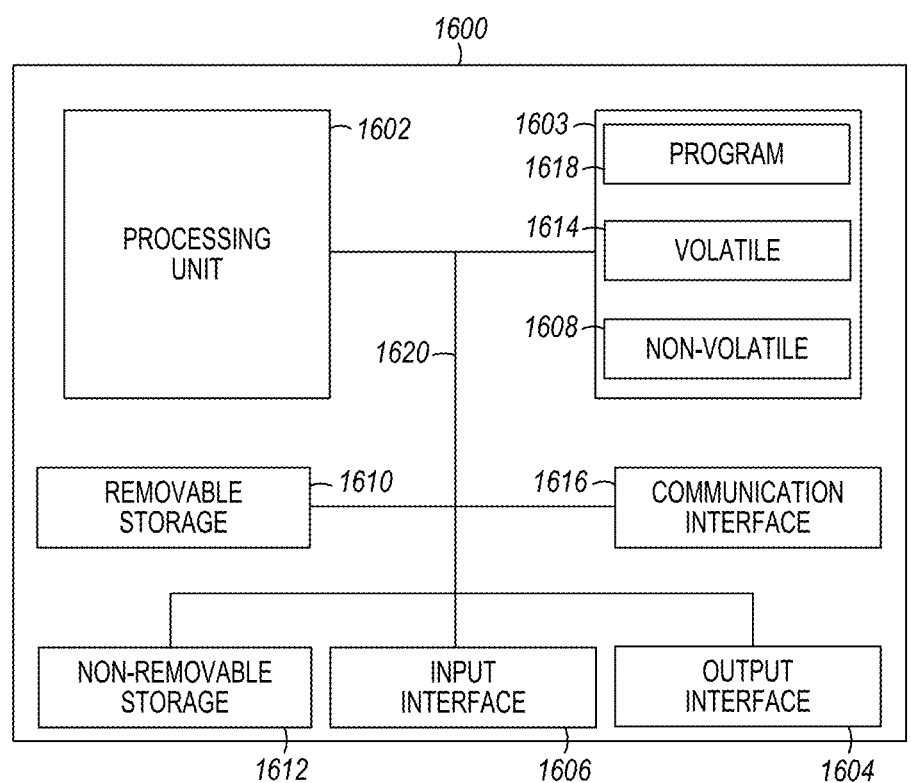
FIG. 16 is a block schematic diagram of a computer system to implement one or more example embodiments.

FIG. 16 is a block schematic diagram of a computer system 1600 for managing selection of multiple active VPNs in a system originally designed to handle one active VPN. System 1600 may also be programmed for performing other methods and algorithms according to example embodiments. All components need not be used in various embodiments.

One example computing device in the form of a computer 1600 may include a processing unit 1602, memory 1603, removable storage 1610, and non-removable storage 1612. Although the example computing device is illustrated and described as computer 1600, the computing device may be in different forms in different embodiments. For example, the computing device may instead be a smartphone, a tablet, smartwatch, smart storage device (SSD), or other computing device including the same or similar elements as illustrated and described with regard to FIG. 16. Devices, such as smartphones, tablets, and smartwatches, are generally collectively referred to as mobile devices or user equipment.

Although the various data storage elements are illustrated as part of the computer 1600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1603 may include volatile memory 1614 and non-volatile memory 1608. Computer 1600 may include— or have access to a computing environment that includes—a variety of computer-readable media, such as volatile memory 1614 and non-volatile memory 1608, removable storage 1610 and non-removable storage 1612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1600 may include or have access to a computing environment that includes input interface 1606, output interface 1604, and a communication interface 1616. Output interface 1604 may include a display device, such as a touchscreen, that also may serve as an input device. The input interface 1606 may include one or more of a touchscreen, touchpad, mouse, keyboard, camera, one or more device-specific buttons, one or more sensors integrated within or coupled via wired or wireless data connections to the computer 1600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1600 are connected with a system bus 1620.

Computer-readable instructions stored on a computer-readable medium are executable by the processing unit 1602 of the computer 1600, such as a program 1618. The program 1618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 1618 along with the workspace manager 1622 may be used to cause processing unit 1602 to perform one or more methods or algorithms described herein.

EXAMPLES

1. A computer implemented method includes intercepting a packet in a mobile device, the packet having a destination network address. A first virtual private network (VPN) plugin for which the packet is intended is identified out of multiple active VPN plugins. The packet is forwarded to the first VPN plugin. The first packet is forwarded via the VPN tunnel while keeping other VPNs having corresponding other plugins active, enabling multiple remote VPN connections using just one VPN tunnel.
2. The method of example 1 and further including intercepting a second packet in the mobile device, determining whether the packet is intended for a VPN or a public network as a function of the destination network address prior to identifying the first VPN plugin, and forwarding the packet to the public network in response to determining that the packet is intended for the non-private network.
3. The method of any of examples 1-2 wherein the first VPN plugin is identified by creating a chain of the multiple plugins and sending the packet to a leading plugin in the chain, wherein the packet is passed along the chain until a plugin determines it owns the packet.
4. The method of example 3 wherein the multiple plugins are prioritized in order in the chain and wherein each plugin maintains a corresponding VPN route.
5. The method of any of examples 1-4 wherein the first VPN plugin is identified by querying the multiple plugins in order of priority, receiving a response from the first plugin that it owns a route for the packet, using the received response to identify the first plugin, and caching the ownership for a transient period to avoid querying for additional packets addressed to a same destination.
6. The method of any of examples 1-5 wherein the first VPN plugin is identified by querying the multiple plugins for routes served by the plugins, receiving routes served by the plugins, caching the routes served by the plugins to identifying plugins, and using the cached routes to identify the first plugin.
7. The method of example 6 and further including prioritizing the multiple plugins such that the first plugin is identified based on a highest priority in response to multiple plugins serving a same route.
8. The method of example 6 and further including receiving a route update from a plugin and updating caching of the routes with the route update.
9. The method of any of examples 1-8 wherein the first VPN plugin is identified by retrieving rules for determining routes served by the plugins, processing the rules to identify the routes, caching the routes served by the plugins to identify plugins, and using the cached routes to identify the first plugin.
10. The method of any of examples 1-9 wherein the first plugin provides encryption of the packet.
11. A machine-readable storage device has instructions for execution by a processor of a machine to cause the processor to perform operations to perform any of the methods of examples 1-10.
12. A device includes a processor and a memory device coupled to the processor. The memory device has a program stored thereon for execution by the processor to perform operations to perform any of the methods of examples 1-10.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
intercepting a packet in a mobile device, the packet having a destination network address;
identifying a first virtual private network (VPN) plugin for which the packet is intended out of multiple active VPN plugins coupled to a single VPN tunnel, wherein the first VPN plugin is identified by:
querying the multiple active VPN plugins for routes served by the multiple active VPN plugins;
receiving routes served by the multiple active VPN plugins;
caching the routes served by the multiple active VPN plugins to identifying plugins; and
using the cached routes to identify the first VPN plugin;
forwarding the packet to the first VPN plugin; and
forwarding the packet via the single VPN tunnel while keeping other VPNs having corresponding VPN plugins active.

2. The computer implemented method of claim 1 and further comprising:
intercepting a second packet in the mobile device;
determining whether the packet is intended for a VPN or a public network as a function of the destination network address prior to identifying the first VPN plugin; and
forwarding the packet to the public network in response to determining that the packet is intended for the public network.

3. The computer implemented method of claim 1, the computer implemented method further comprising prioritizing the multiple plugins such that the first plugin is identified based on a highest priority in response to multiple plugins serving a same route.

4. The computer implemented method of claim 1, the computer implemented method further comprising:
receiving a route update from a plugin; and
updating caching of the routes with the route update.

5. The computer implemented method of claim 1 wherein the first VPN plugin provides encryption of the packet.

6. A computer implemented method comprising:
intercepting a packet in a mobile device, the packet having a destination network address;
identifying a first virtual private network (VPN) plugin for which the packet is intended out of multiple active VPN plugins coupled to a single VPN tunnel wherein the first VPN plugin is identified by:
retrieving rules for determining routes served by the multiple active VPN plugins;

processing the rules to identify the routes;
caching the routes served by the multiple active VPN plugins to identify plugins; and
using the cached routes to identify the first VPN plugin;
forwarding the packet to the first VPN plugin; and
forwarding the packet via the single VPN tunnel while keeping other VPNs having corresponding VPN plugins active.

7. A machine-readable storage device having instructions for execution by a processor of a machine to cause the processor to perform operations to perform a method, the operations comprising:
intercepting a packet in a mobile device, the packet having a destination network address;
identifying a first virtual private network (VPN) plugin for which the packet is intended out of multiple active VPN plugins coupled to a single VPN tunnel, wherein the first VPN plugin is identified by:
querying the multiple active VPN plugins for routes served by the multiple active VPN plugins;
receiving routes served by the multiple active VPN plugins;
caching the routes served by the multiple active VPN plugins to identifying plugins; and
using the cached routes to identify the first VPN plugin;
forwarding the packet to the first VPN plugin; and
forwarding the packet via the single VPN tunnel while keeping other VPNs having corresponding VPN plugins active.

8. The machine-readable storage device of claim 7, the operations further comprising:
intercepting a second packet in the mobile device;
determining whether the packet is intended for a VPN or a public network as a function of the destination network address prior to identifying the first VPN plugin; and
forwarding the packet to the public network in response to determining that the packet is intended for the public network.

9. A machine-readable storage device having instructions for execution by a processor of a machine to cause the processor to perform operations to perform a method, the operations comprising:
intercepting a packet in a mobile device, the packet having a destination network address;
identifying a first virtual private network (VPN) plugin for which the packet is intended out of multiple active VPN plugins coupled to a single VPN tunnel, wherein the first VPN plugin is identified by:
retrieving rules for determining routes served by the multiple active VPN plugins;
processing the rules to identify the routes;
caching the routes served by the multiple active VPN plugins to identify plugins; and
using the cached routes to identify the first VPN plugin;
forwarding the packet to the first VPN plugin; and
forwarding the packet via the single VPN tunnel while keeping other VPNs having corresponding VPN plugins active.

10. A device comprising:
a processor; and
a memory device coupled to the processor and having a program stored thereon for execution by the processor to perform operations comprising:
intercepting a packet in a mobile device, the packet having a destination network address;
identifying a first virtual private network (VPN) plugin for which the packet is intended out of multiple active VPN plugins coupled to a single VPN tunnel, wherein the first VPN plugin is identified by:
querying the multiple active VPN plugins for routes served by the multiple active VPN plugins;
receiving routes served by the multiple active VPN plugins;
caching the routes served by the multiple active VPN plugins to identifying plugins; and
using the cached routes to identify the first VPN plugin;
forwarding the packet to the first VPN plugin; and
forwarding the packet via the single VPN tunnel while keeping other VPNs having corresponding VPN plugins active.

\* \* \* \* \*